United States Patent [19]

Hale

[11] 3,827,164
[45] Aug. 6, 1974

[54] AN EDUCATIONAL DEVICE

[76] Inventor: Gloria M. Hale, 16282 Main St. Apt. 3, Tustin, Calif. 92680

[22] Filed: Feb. 9, 1973

[21] Appl. No.: 331,229

[52] U.S. Cl. .................................... 35/37, 35/66
[51] Int. Cl. ...................... G09b 11/04, B431 1/12
[58] Field of Search ............... 35/36, 37, 66, 48 A; 283/45

[56] References Cited
UNITED STATES PATENTS

| 236,070 | 12/1880 | Newman | 283/45 |
|---|---|---|---|
| 636,432 | 11/1899 | Horney | 283/45 |
| 1,555,642 | 9/1925 | Deutsch | 35/66 |
| 2,137,736 | 11/1938 | Watkins | 35/48 A |
| 2,596,890 | 5/1952 | Dechert | 35/66 |

Primary Examiner—Wm. H. Grieb

[57] ABSTRACT

An educational device that includes first, second and third sheets connected at the edges thereof, and which is particularly adapted for use by a small child. The first sheet supports a layer of colored wax that is overlaid by the second sheet. The second sheet is adapted to have portions thereof forced into adhering contact with the wax layer when a stylus is moved thereover. The second sheet is preferably translucent, and the third sheet transparent.

Insignia-defining means are preferably removably mounted on the third sheet, and define areas therebetween on which a user may move a stylus in an attempt to reproduce the insignia. However, if desired, the insignia may be made a permanent part of either the second or third sheets.

As an alternate structure, a fourth transparent sheet may be interposed between the second and third sheets, with the fourth sheet providing an area on which the user may draw with the stylus when the third sheet is peeled back. The wax layer and second sheet cooperate to visually record the path of the stylus, irrespective of whether the latter is moved in pressure contact with the third or fourth sheet. The reproduced insignia on the second sheet is easily removed therefrom by peeling it away from the wax layer.

4 Claims, 6 Drawing Figures

PATENTED AUG 6 1974  3,827,164

AN EDUCATIONAL DEVICE

BACKGROUND OF THE INVENTION

1. Field of the Invention

Educational device.

2. Description of the Prior Art

In the past, various forms of wax slates have been devised in which a translucent sheet is bonded to a wax layer to define a drawing, numerals, letters, and the like, by bringing a stylus into moving pressure contact with the transparent or translucent sheet. Such devices, in the main, have been for amusement rather than educational purposes.

The primary object in devising the present invention is to provide an educational device in which a person uses a stylus to removably record on a second sheet that overlies a wax layer certain insignia, with the user copying the insignia from a third sheet that is disposed adjacent the area on which the stylus is moved. In this manner a child or other user may rapidly learn to form letters, numerals, words, as well as to arrange words in sentences, due to having a pattern or insignia-defining means adjacent the area on which he is moving the stylus.

Another object of the present invention is not only to provide insignia-defining means as above described, but in addition, removably mounting the insignia-defining means on the device in such a manner that they may be changed and altered as a child progresses in his learning process.

A further object of the invention is to supply an educational device that has an extremely simple structure, is inexpensive, may be used both for educational and amusement purposes, one that is compact and occupies a minimum of space when not in use, and one particularly well adapted for use by a child or a person learning a foreign language.

SUMMARY OF THE INVENTION

An educational device that includes a rigid first sheet that has a first side colored, at least partially, with a layer of colored wax, a second pliable translucent sheet that overlies said wax layer and adheres thereto when substantial pressure is applied to the second sheet by means of a pointed instrument such as a stylus, or the like, and a third sheet of a tough transparent material that overlies said second sheet, with said second and third sheets having edges thereof secured to the first sheet. In using the educational device the stylus or pointed instrument is brought into moving pressure contact with the third sheet, to prevent the second sheet which is of a pliable and soft nature from being torn.

Insignia-defining means are preferably removably secured to the third sheet and define a plurality of areas therebetween. By use of a stylus in moving pressure contact with the third sheet, the user may attempt to reproduce in said areas the insignia adjacent thereto, with the path traveled by the stylus being visually recorded on the second sheet, as portions of the second sheet are forced into pressure contact with the wax layer. The reproduced insignia are easily removed from the device by peeling back the second sheet out of contact with the wax layer.

The insignia-defining means are preferably elongate printed strips that may be removably inserted in pockets defined in the third sheet. However, if desired, the insignia-defining means may be printed as a permanent part of either the second or third sheets. The insignia-defining means may take the form of letters, numerals, the alphabet, or words arranged in sentences. In using this educational device, the user attempts to reproduce the insignia on the strips in the areas of the third sheet immediately adjacent thereto, and the printed strips are changeable to provide insignia of increasing difficulty as the user's learning process progresses.

DESCRIPTION OF THE PREFERRED EMBODIMENTS

Figure 1:
FIG. 1 is a perspective view of a preferred form of the educational device.
Figures 2, 3:
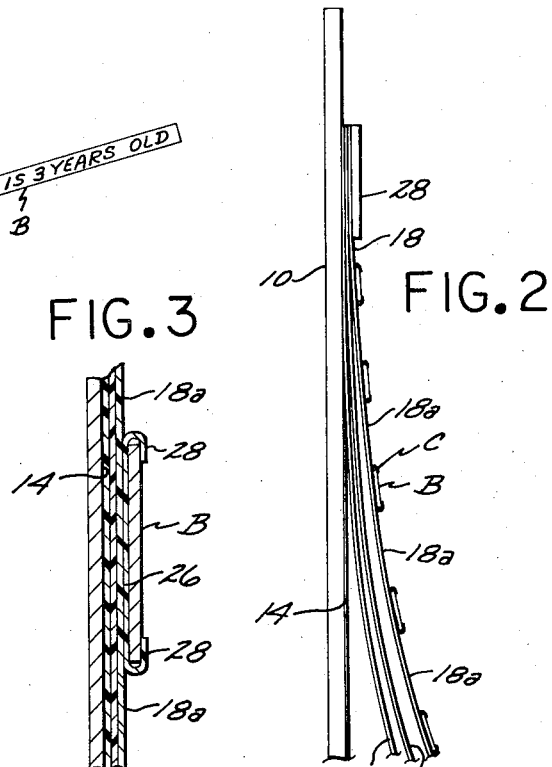
FIG. 2 is a side elevational view of the device shown in FIG. 1.
FIG. 3 is a fragmentary longitudinal cross-sectional view of the device shown in FIG. 1, taken on the line 3—3 thereof.

The preferred form A of the educational device, as can best be seen in FIGS. 1 to 3 inclusive, includes a first stiff, rigid sheet 10 formed from cardboard or a like material. If desired, the first sheet 10 may have an ornamental upper portion 12 as shown in FIG. 1. Below the upper portion 12, the first sheet 10 has a film or layer 14 of a colored wax on a first side thereof. A second sheet 16 is provided that is substantially the width of the first sheet, with the upper edge portion of the second sheet 16 being adhered or bonded to the first sheet 10 below the upper portion thereof.

The second sheet 16 is formed from a soft, pliable translucent material and of a type that will adhere to the layer of wax 14 when brought into substantial pressure contact therewith. The upper portion of the second sheet 16, as may be seen in FIG. 2, is adhered to the first sheet 10 by conventional means. A third sheet 18 is also provided that is substantially the same width as that of the first and second sheets, with the third sheet being formed from a tough, transparent plastic material.

The preferred form A of the invention is illustrated in FIGS. 1 to 3 inclusive as including a fourth sheet 20 that is interposed between the second and third sheets 16 and 18, with the fourth sheet being formed from the same material as the third sheet 18. The fourth sheet is desirable, but is not absolutely necessary, in the preferred form A of the invention. The upper portions of the third sheet 18 and fourth sheet 20 are secured to the upper portions of the first and second sheets 10 and 16 by conventional means (not shown).

The preferred form A of the invention includes a number of insignia-defining means B in the form of a number of elongate flat members 22, preferably formed of paper, plastic or the like, and each member 22 has an insignia 24 thereon that may be either numerals, letters, words, or sentences that would be understandable to a relatively young child. A number of transversely extending, longitudinally spaced elongate strips 26 are secured to the exterior surface of the third sheet 18, with each strip, as shown in FIG. 3, having U-shaped tabs 28 formed as an integral part thereof that extend inwardly toward one another from the longitudinal sides of the strip. Each strip 26 and pair of tabs 28 thereon cooperatively define a number of pockets C, as may be seen in FIG. 1, with each pocket being adapted to slidably and removably support one of the insignia-defining means B above described.

The pockets C are so arranged on the exterior surface of the third sheet 18 that a number of longitudinally spaced, transversely extending areas 18a are formed between the pockets, and these areas are of sufficient size to have the insignia 24 on the strip 22 thereabove copied thereon. Copying of the insignia 24 onto one of the areas 18a to form a reproduction of the insignia is accomplished by moving a pointed stylus S in pressure contact with that portion of the third sheet 18 that defines the areas 18a. When the stylus S is moved into pressure contact with one of the areas 18a, the pointed end of the stylus exerts pressure through the fourth sheet 20 onto the second sheet 16 to force portions of the second sheet into pressure contact with the layer of colored wax 14.

Figure 4:
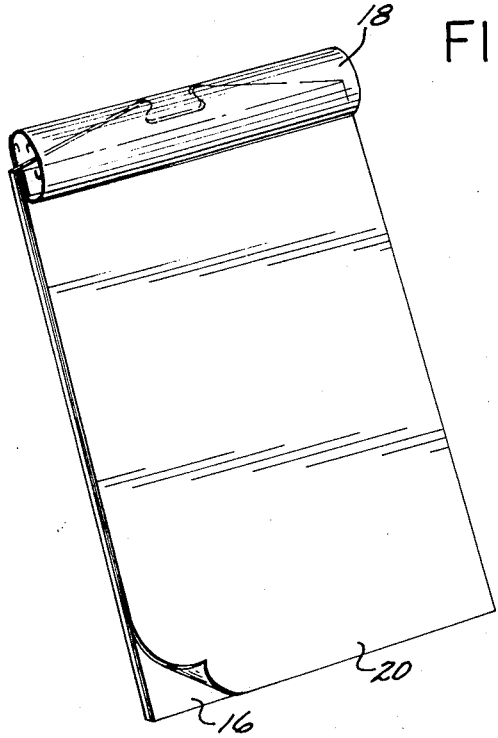
FIG. 4 is a perspective view of the device shown in FIG. 1 after the third sheet has been rolled back to expose a fourth sheet of like material, but one that contains no insignia thereon.

Thus, the path of the stylus is visually reproduced by portions of the layer of wax 14 adhering to the under side of the second sheet 16, and as a result a reproduction 24' of the insignia 24 is made visible to the person using the preferred form A of the invention. When it is not desired to use the preferred form A of the educational device to reproduce the insignia 24, the third sheet 18 may be rolled back as shown in FIG. 4, to expose the fourth sheet 20. The stylus 26 may then be brought into moving pressure contact with any desired portion of the entire surface of the fourth sheet 20 to form drawings, or the like, that are visible to the user of the device in the same manner previously described.

For decorative purposes, the exterior surface of the edge portions of the second, third and fourth sheets 16, 18 and 20, respectively, that are bonded to the first sheet 10, may have a transversely extending tab 28 overlie the same on which a suitable identifying name is printed such as illustrated in FIG. 1. The members 22, as previously mentioned, are removable from the pockets C, and as a result, as the child's or user's learning increases, additional members may be inserted in the pockets to provide insignia 24 to be reproduced that are of increasing difficulty. It will be apparent that it is not desirable to provide a plain sheet on which the child may draw, but to use the preferred form A for educational purposes only, that the fourth sheet 20 shown in FIG. 4 may be omitted as an element in the preferred form A of the device.

Figure 5:
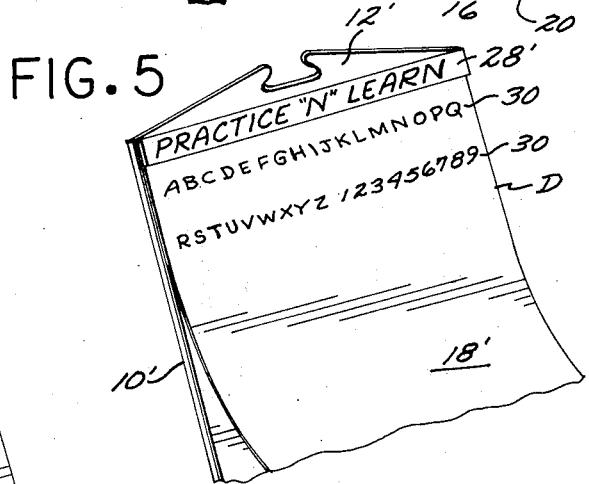
FIG. 5 is a perspective view of a first alternate form of the device in which the insignia is imprinted on the sheet on which the stylus is brought into moving pressure contact.

A first alternate form D of the device is shown in FIG. 5 that differs from the preferred form in that the pockets C are omitted from the third sheet 18, and the insignia 30 to be copied is printed on the third sheet. Elements of the first alternate form D that are common to the preferred form A are identified by the same numerals previously used, but to which primes have been added.

Figure 6:
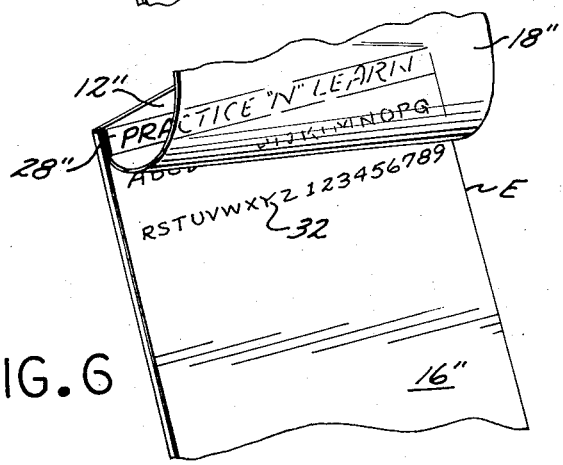
FIG. 6 is a perspective view of a second alternate form in which the insignia is defined on the sheet that is brought into pressure contact with the wax layer by use of a stylus.

A second alternate form E of the device is shown in FIG. 6 that differs from the preferred form A in that the pockets C are eliminated and the insignia 32 is printed on the second sheet 16''. Elements in the second alternate form E that are common to the preferred form are identified in FIG. 6 by the same numerals previously used, but to which double primes have been added.

The use and operation of the various forms of the device have been described previously in detail and need not be repeated.

I claim:

1. An educational device of the type that includes a first rigid sheet having a first surface that is at least partially covered with a colored wax layer, a second sheet that is soft and translucent and is attached at an edge thereof to said first sheet and overlies said first surface, which second sheet removably adheres to said wax layer when forced into substantial pressure contact therewith, a stylus, and a third sheet formed from a tough transparent material that is attached at one edge to said first sheet and overlies said first sheet with said device being characterized by; a plurality of flat insignia-defining means that are defined on at least one of said second or third sheets, said insignia-defining means being spaced from one another to define substantial areas therebetween; said means including 1) a plurality of flat members that have said insignia imprinted thereon with each of said members being of substantially less area than said third sheet; 2) a plurality of pockets defined in said third sheet with each of said pockets removably supporting one of said members; and said device permitting a user to attempt to reproduce said insignia by moving said stylus in pressure contact with that portion of said third sheet that defines said areas, with the path of travel of said stylus and the reproduction of said insignia remaining visible due to the pressure-contacted portions of said second sheet removably adhering to said wax layer, and said reproductions of said insignia being removed from said device when said sheet is peeled from said wax layer.

2. An educational device as defined in claim 1 in which said plurality of members are a plurality of paper strips.

3. An educational device as defined in claim 1 wherein each of said pockets is defined by an elongate strip of uniform width that has two curved U-shaped tabs that extend inwardly towards one another from the longitudinal edges of said member, and said tabs removably engaging the longitudinal edges of one of said members to removably support said members on said third sheet.

4. An educational device as defined in claim 1 which further includes a fourth sheet that has an edge thereof secured to said first sheet, said fourth sheet being formed from a tough transparent material and disposed between said second and third sheets, with said fourth sheet providing an unobstructed area on which a child can draw with said stylus when said third sheet is rolled back to expose said fourth sheet, with said wax layer and second sheet cooperating to visually recording the path of the stylus as moved by a user irrespective of whether said stylus is in pressure contact with said third or said fourth sheet.

* * * * *